US010403180B2

(12) United States Patent
Komanduri et al.

(10) Patent No.: US 10,403,180 B2
(45) Date of Patent: Sep. 3, 2019

(54) APPARATUS WITH ISOLATED DISPLAY AND LIGHTING PORTIONS AND OPTICAL PASSAGES FOR BACKLIT ILLUMINATION

(71) Applicant: ABL IP Holding LLC, Conyers, GA (US)

(72) Inventors: Ravi Kumar Komanduri, Brambleton, VA (US); An Mao, Jersey City, NJ (US)

(73) Assignee: ABL IP Holding LLC, Conyers, GA (US)

( * ) Notice: Subject to any disclaimer, the term of this patent is extended or adjusted under 35 U.S.C. 154(b) by 170 days.

(21) Appl. No.: 15/590,434

(22) Filed: May 9, 2017

(65) Prior Publication Data

US 2018/0328581 A1     Nov. 15, 2018

(51) Int. Cl.
| F21V 7/00 | (2006.01) |
| G02F 1/00 | (2006.01) |
| F21V 11/06 | (2006.01) |
| F21V 13/10 | (2006.01) |
| G09F 13/04 | (2006.01) |
| F21Y 105/10 | (2016.01) |

(52) U.S. Cl.
CPC ............ *G09F 13/04* (2013.01); *F21V 7/0083* (2013.01); *F21V 11/06* (2013.01); *F21V 13/10* (2013.01); *G02F 1/00* (2013.01); *F21Y 2105/10* (2016.08)

(58) Field of Classification Search
CPC .. F21V 11/00; F21V 33/0052; F21Y 2113/13; G09F 13/04
See application file for complete search history.

(56) References Cited

U.S. PATENT DOCUMENTS

| 6,111,696 | A | 8/2000 | Allen et al. | |
| 8,998,418 | B2* | 4/2015 | Huang | G02B 27/0994 |
| | | | | 353/20 |
| 9,476,567 | B2* | 10/2016 | Seuntiens | E04B 9/32 |
| 9,709,245 | B2* | 7/2017 | Di Trapani | F21V 9/02 |
| 2006/0055838 | A1 | 3/2006 | Mi et al. | |
| 2006/0242870 | A1* | 11/2006 | Atemboski | F21S 8/04 |
| | | | | 40/428 |
| 2007/0164975 | A1* | 7/2007 | Lim | F21V 33/0052 |
| | | | | 345/102 |
| 2014/0185285 | A1* | 7/2014 | Jorgensen | F21V 14/02 |
| | | | | 362/232 |

* cited by examiner

*Primary Examiner* — Peggy A Neils
(74) *Attorney, Agent, or Firm* — RatnerPrestia

(57) ABSTRACT

The examples relate to implementations of an apparatus and a luminaire that use isolated display and lighting portions and optical passages for backlit general illumination through the display. The apparatus includes a general illumination light source, an optical coupling, and an optical array. A luminaire includes the apparatus and a display light board. The display light board may include display light emitters and transparent regions. The transparent regions enable general illumination light to pass through the display light board. The general illumination light source outputs general illumination light that is directed by the optical coupling toward the optical array. The optical array has optical passages and optical array supports. The optical array supports frame the display light emitters and the optical passages channel the directed general illumination light from the optical coupling around display light emitters framed near the optical array supports. Near-field shadow regions are formed under the display light emitters.

16 Claims, 12 Drawing Sheets

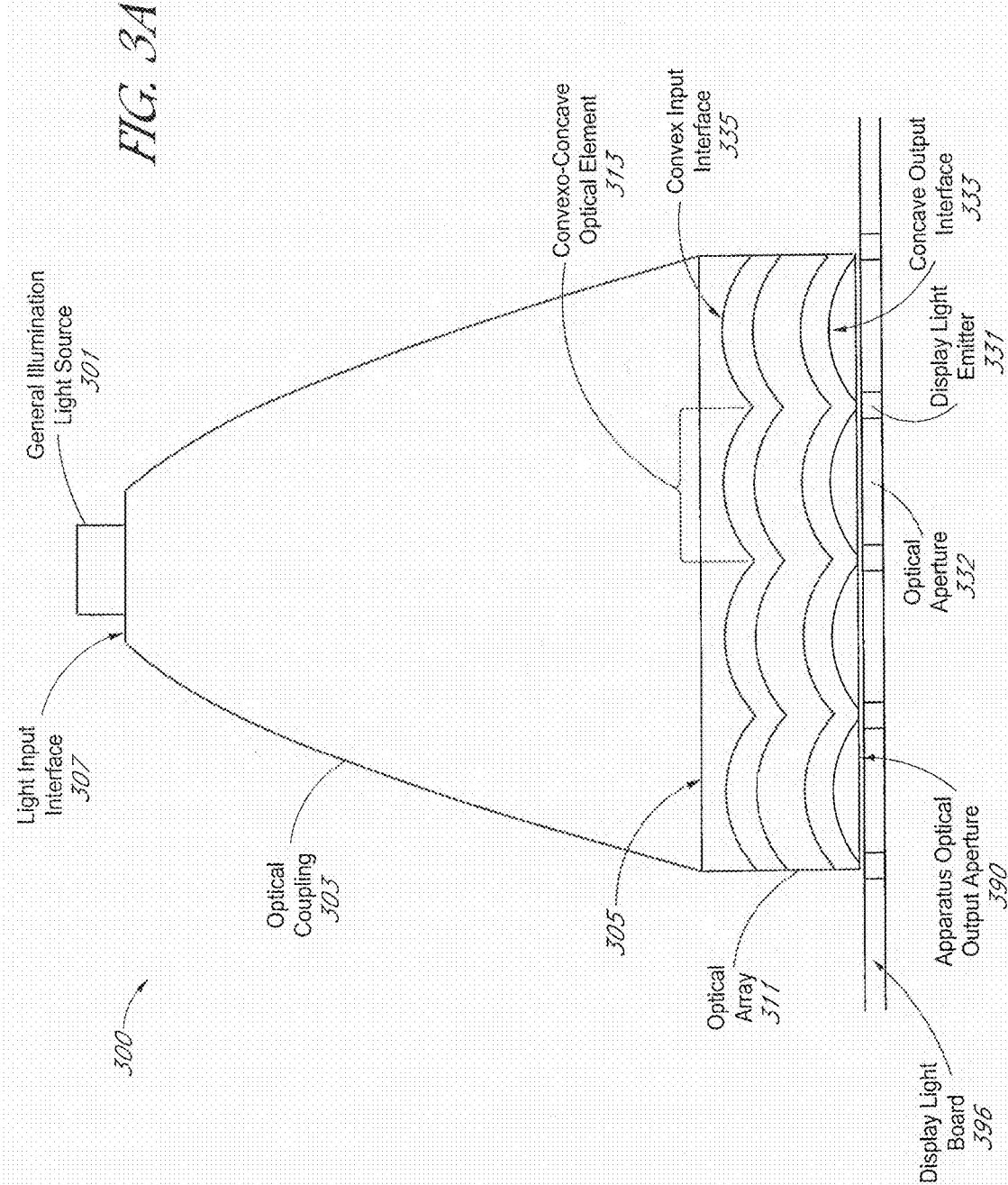

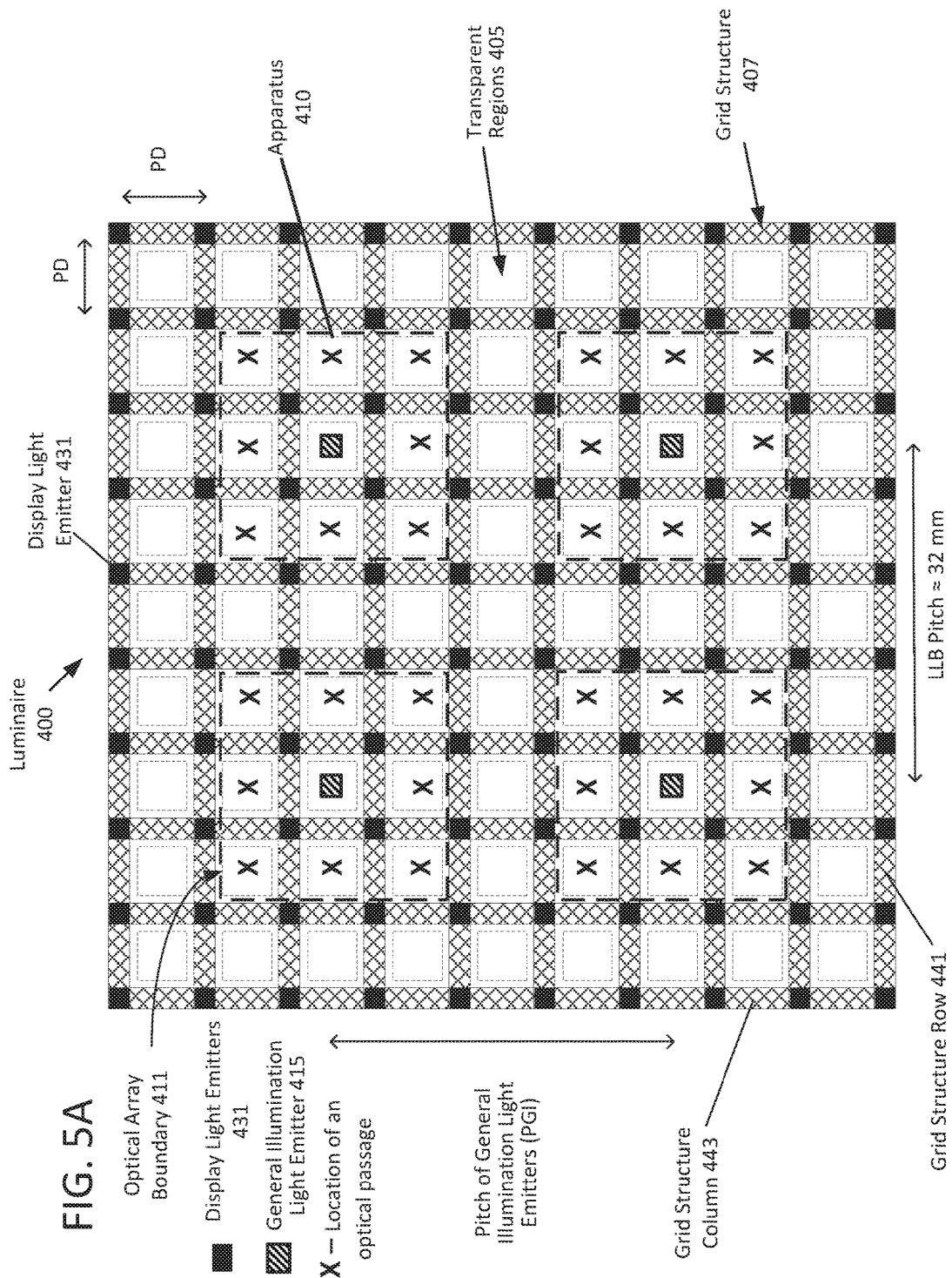

APPARATUS WITH ISOLATED DISPLAY AND LIGHTING PORTIONS AND OPTICAL PASSAGES FOR BACKLIT ILLUMINATION

TECHNICAL FIELD

The present subject matter relates to techniques to improve the transparency of a display device that is co-located with a general illumination light source, by providing optics to route general illumination light emitted behind the display device through an aperture in the display device and to shape the far field distribution of the routed general illumination light while allowing presentation of an image by the display device.

BACKGROUND

Electrically powered artificial illumination lighting has become ubiquitous in modern society. Electrical lighting equipment is commonly deployed, for example, in homes, buildings of commercial and other enterprise establishments, as well as in various outdoor settings.

In conventional luminaires, the luminance output can be turned ON/OFF and often can be adjusted up or dimmed down. In some devices, e.g., using multiple colors of light emitting diode (LED) type sources, the user may be able to adjust a combined color output of the resulting illumination. The changes in intensity or color characteristic of the illumination may be responsive to manual user inputs or responsive to various sensed conditions in or about the illuminated space.

There also have been proposals to use displays or display-like devices mounted in or on the ceiling to provide variable lighting. The Fraunhofer Institute, for example, has demonstrated lighting equipment using luminous tiles, each having a matrix of red (R) LEDs, green (G), blue (B) LEDs and white (W) LEDs as well as a diffuser film to process light from the various LEDs. The LEDs of the system were driven to simulate or mimic the effects of clouds moving across the sky. However, lighting equipment for illumination and displays for image output have fundamentally different requirements, for example, for consumer applications. Although use of displays allows for variations in appearance that some may find pleasing, the displays or display-like devices typically have been optimized for image output and do not provide particularly good illumination for general lighting applications. A display typically has a Lambertian output distribution over substantially the entire surface area of the display screen, which does not provide the white light intensity and coverage area at a floor or ceiling height offered by a similarly sized ceiling-mounted light fixture. By contrast, a device dedicated to a general illumination application will typically have a narrower directed light output distribution, e.g. as a spot light or as a downlight for area or task illumination, as a wall wash, etc.

Liquid crystal displays (LCD) also are rather inefficient. For example, backlights in LCD televisions have to produce almost ten times the amount of light that is actually delivered at the viewing surface. Therefore, any LCD displays that might be used as lighting products need to be more efficient than typical LCD displays for the lighting device implementation to be commercially viable.

Projection displays are typically cost effective alternatives to direct-view displays such as LCDs, when large area and high brightness are desired. But the color quality and light distribution from prior projection displays are not sufficient for general lighting applications.

Different techniques and/or technologies have been proposed in an attempt to increase the efficiency of a display device or a lighting device, such as a combination of light recycling film and display, or by adding a brightness enhancement film to a lighting fixture or a display. However, these techniques and/or technologies are directed to improving distinct devices specifically for either display applications or lighting applications.

Examples of other uses of lighting in combination with display technologies include various configurations of signage that include light sources as backlighting that are positioned behind a design feature such a diffuser or screen with an image or wording. Examples of such backlit signage includes advertising signs, door exit signs and other examples of signage that would benefit from backlighting. Some of the signs may be controllable to change wording or an image presented on the display device of the sign. In some instances of advertising signage, a transparent display can be used to provide advertising without obstructing a view of either the interior of a store when viewed from the exterior or vice versa, as well as providing an easily changeable design. However, backlit signage without additional lighting is not typically configured to provide general illumination that complies with governmental regulations and industry standards applicable to the environment in which the signage is installed.

SUMMARY

Hence, there is room for further improvement in an apparatus for use as a lighting device or as one of a number of similar component apparatuses of a luminaire, where the lighting device or luminaire offers the general illumination lighting characteristic of a lighting device (e.g. intensity, color and/or output distribution) and incorporates a display device. Examples of a lighting and display type luminaire use relatively transparent display devices.

An example of an apparatus is provided that includes a general illumination light source, an optical coupling and an optical array. The general illumination light emitter is configured to emit general illumination light for illuminating a space. The optical coupling is configured to receive the general illumination light emitted by the light source and to direct general illumination light emitted by the light source toward a light output interface of the optical coupling. The optical array includes optical passages through the optical array that are coupled to receive general illumination light via the light output interface of the optical coupling. The configuration of the optical coupling together with a configuration of the optical passages through the optical array define a distribution of general illumination light output of the apparatus into the illuminated space. The distribution of general illumination light output includes near-field shadow regions formed between outputs of two or more of the optical passages.

Additional light emitters may be mounted at locations substantially corresponding to at least some of the near-field shadow regions of the optical array and are oriented to emit additional light into the space to be illuminated.

Other examples provide a luminaire that outputs general illumination lighting and display light for presentation of an image. The luminaire, in this example, includes a number of apparatuses coupled to one another to provide the general illumination light and/or an image display. Each of the apparatuses includes a general illumination light source, an optical coupling and an optical array. The general illumination light source emits general illumination light for illuminating a space. The optical coupling has a light input interface and a light output interface, and is configured to direct general illumination light emitted by the general illumination light source at the light input interface toward the light output interface. The optical array is coupled to the output interface of the optical coupling. The optical array includes a number of optical passages and a number of optical array supports. The optical array supports being in between adjacent optical passages of the number of optical passages. Each of the optical passages is configured to reflect a portion of the light received from the light output interface toward an output of the optical passage. Each luminaire includes a set of display light emitters in a spaced arrangement relative one another, each individual display light emitter of the set of display light emitters is positioned near a corresponding optical array support of a respective optical passage. The luminaire is configured to display an image via the set of display light emitters and emit general illumination light via the general illumination light source from the optical array.

Another example of an apparatus is also provided. The apparatus includes a general illumination light source, an optical coupling, and an array of convexo-concave lenses. The general illumination light source emits general illumination light for illuminating a space. The optical coupling has a light input interface and a light output interface, and is configured to direct general illumination light emitted by the general illumination light source at the light input interface toward the light output interface. The array of convexo-concave lenses are optically coupled to the light output interface. Each lens of the array of convexo-concave lenses is configured to direct light received at a convex input interface of the respective convexo-concave lens to a concave output interface of the respective convexo-concave lens.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 3A illustrates a cross-sectional view of yet another example of an apparatus that incorporates a number of convexo-concave lenses for modifying a general illumination light for distribution through optical apertures between display emitters.

FIG. 5A is a front view of an example of a luminaire incorporating a number of apparatuses, each of which may be implemented using any of the examples shown in FIGS. 1A-4.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Reference now is made in detail to the examples illustrated in the accompanying drawings and discussed below.

Figure 1A:
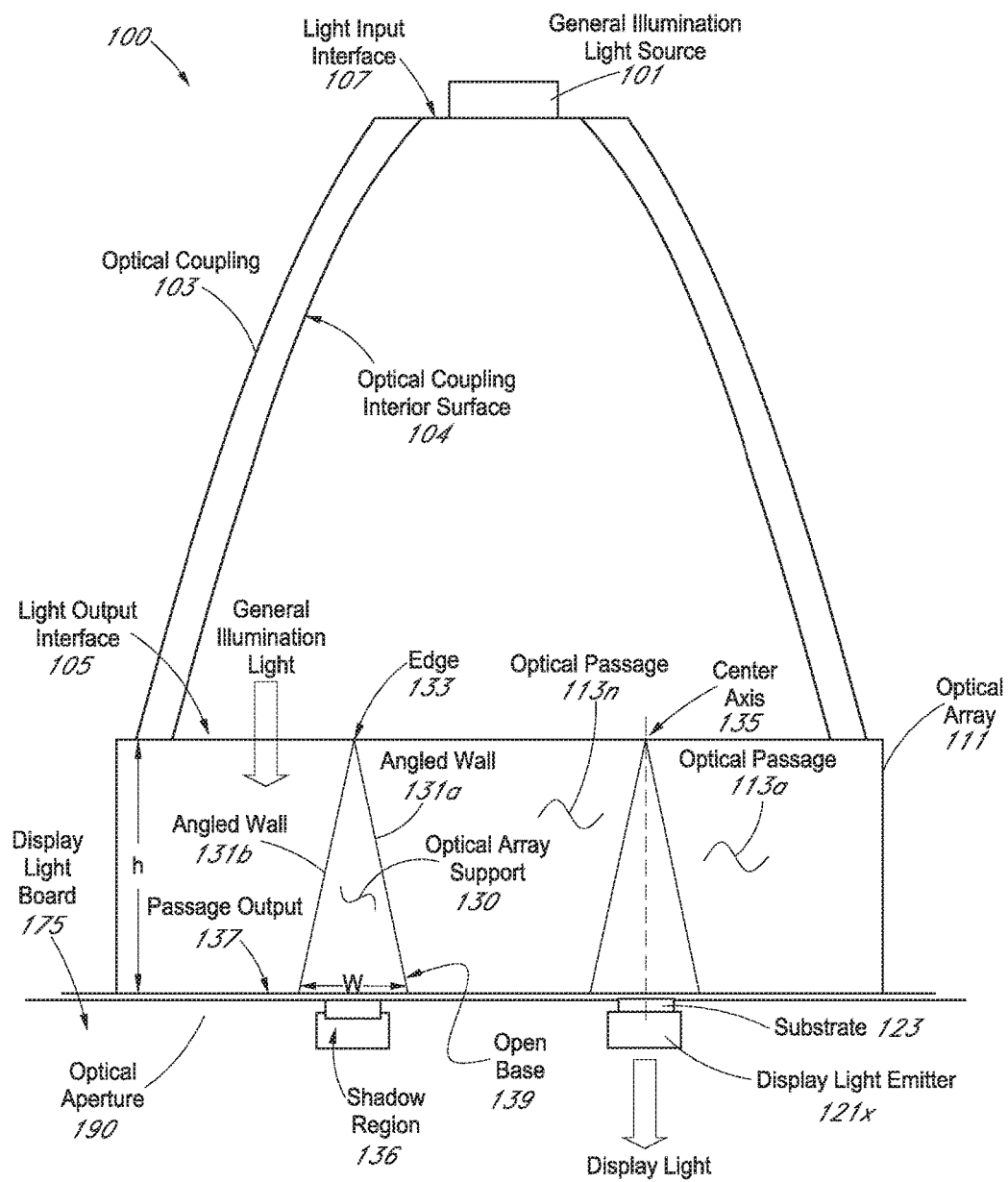
FIG. 1A illustrates a cross-sectional view of an example of an apparatus for providing general illumination lighting and presentation of an image.

FIG. 1A illustrates a cross sectional view of an apparatus 100 that directs general illumination light through an optical array configured to provide general illumination light having a set distribution and also present display light to a space which the apparatus may be illuminating. The drawing shows the apparatus in an orientation for outputting both general illumination light and light of the displayed image downward, for example, for a task or downlighting application. The example, however, is non-limiting; and it should be apparent that the apparatus may be used in other orientations for other illumination and display applications.

As shown in the cross-sectional view of FIG. 1A, the apparatus 100 includes a general illumination source 101, an optical coupling 103 and an optical array 111.

In the example of FIG. 1A, the general illumination light source 101 is configured to emit general illumination light for illuminating a space (shown in another example). Examples of the general illumination light source 101 include light emitting diodes (LEDs), organic light emitting diodes (OLEDs), micro LEDs, nanorod or nanowire LEDs, fluorescent lamp(s), and halogen lamp(s). The general illumination light source 101 may be coupled to circuitry (not shown in this example) that is configured to drive and control operation (e.g. On/Off, brightness, modulation, or the like) of the general illumination light source 101.

The optical coupling 103 is configured to receive the general illumination light emitted by the light source 101 and to direct general illumination light emitted by the light source toward a light output interface 105 of the optical coupling 103. Examples of the optical coupling 103 may include a light input interface 107 opposite the light output interface 105. The light input interface 107 may be an opening in the optical coupling that accepts the general illumination light source 101, or the interface 107 may be a transparent optical passage or aperture through the proximal end wall of the optical coupling that allows passage of light from the general illumination light source 101 into the interior of the optical coupling 103.

The interior configuration of the optical coupling 103 directs light received from the light source 101 at the light input interface 107 toward and through the light output interface 105. The interior surface 104 of the optical coupling 103 may be reflective and in the form of an optical reflector, such as a parabolic reflector, a conical reflector, a faceted reflector, or a pyramidal reflector. Alternatively, the interior surface 104 of the optical coupling 103 may be metallic, such as aluminum, a thin-film, a ceramic or a coated-plastic surface that reflects the general illumination light toward the light output interface 105. Suitably sized total internal reflection (TIR) lenses may be another option for implementing the optical coupling 103. The optical array 111 is coupled to receive general illumination light via the output interface 105 of the optical coupling 103.

Figure 1B:
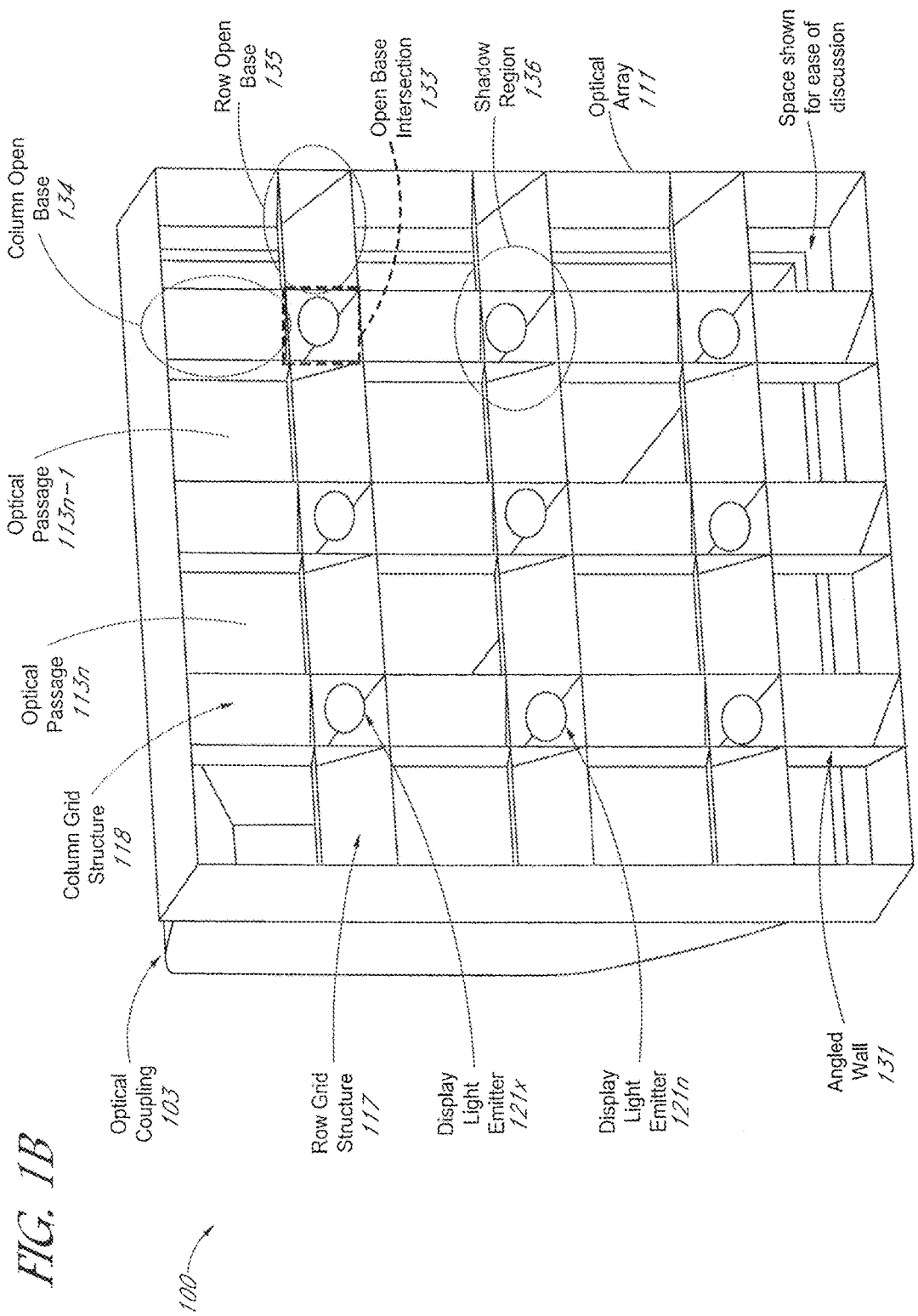
FIG. 1B illustrates a plan view of the apparatus example shown in FIG. 1A.
Figure 1C:
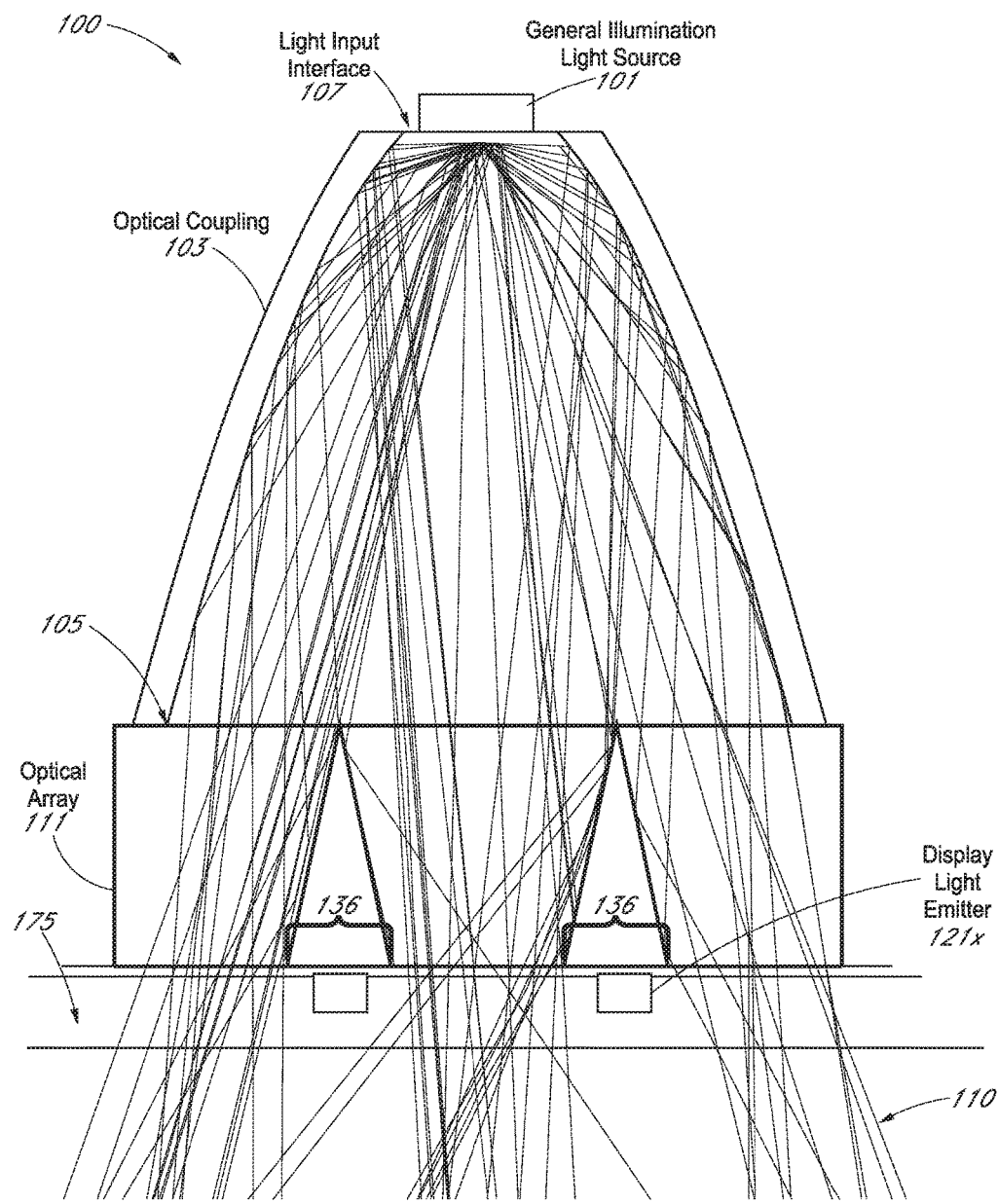
FIG. 1C illustrates a simplified ray trace example of the flow of the general illumination light through to the output distribution of the apparatus example shown in FIGS. 1A and 1B.

In the example of FIG. 1C, the light output by the general illumination light source 101 is directed by the optical coupling 103 toward the optical array 111. The combination of the optical coupling 103 and the optical array 111 provides for an output distribution 110 that provides general illumination light to the space to be illuminated, with a particular field or distribution of light output suitable for a general lighting application of the apparatus 100.

The optical array 111 may include a grid of reflective members having walls 131 defining the optical passages 113*a-n*. The walls 131 are angled relative to the central axis of the apparatus 100 (relative to the vertical in the illustrated orientation). A number (four in the example) of the angled reflective walls 131 define each optical passage 113 and are configured to reflect the directed light incident on the angled walls 131 through the output 137 of the respective one of the optical passages optical passages 113*a* to 113*n* (generally referred to as 113). In the example, the angled walls 131 of the array 111 allow general illumination light from the source 101 to pass through the respective passages 113. The optical passages 113 may be hollow, have their ends covered with optical materials, be partially or completely filled with a transparent material, or the like. The optical passages 113 are coupled, optically and/or mechanically, to receive general illumination light via the output interface 105 of the optical coupling 103.

The interior of the optical passages 113 may have reflective walls that further aid in directing the general illumination light out of the optical passages 113. In the example of FIG. 1A, the optical passages 113 are formed from angled walls 131. The angled walls 131 are configured to reflect the directed light incident on the angled walls toward the passage output 137. The angled walls 131 are angled with respect to the center axis 137. Two adjacent walls form an edge 133 at a proximal end of the array 111 near the output interface 105 of the optical coupling 103. The two adjacent angled walls 131 also form an open base 139 (wider than the edge 133) at a distal end of the array 111 near the passage outputs 137 of adjacent passages and near the transparent optical aperture 190 of the display light board 175. Each passage output 137 is configured to output the directed general illumination light toward the transparent optical aperture 190 and into the space to be illuminated.

The angled walls 131 are shown as flat represented by straight lines in the cross-sectional view, but the flat walls are angled relative to the axis (or the vertical in the illustrated orientation). The angled walls 131, instead of being straight, may be arced to form either a concave or convex surface that extends from the edge 133 to a base 139 adjacent to the passage output 137. Alternatively, the angled walls 131 may be faceted in a manner that may increase the amount of general illumination light output from the optical passages 113. An advantage of the illustrated configurations is that the walls 131 make small angles with respect to the incident general illumination so that the area of the optical passage 113 gradually reduces from the light output interface 105 above the optical array 111 to the passage output 137.

An angled wall 131*a* of the optical array 111 combined with another angled wall 131*b* of the optical array 111 forms an optical array support 130, in this example, from the edge 133 to the open base 139. The edge 133 may be a solid edge (e.g., welded or bonded by a solid adhesive) that does not allow light to pass into the optical array support 130. Alternatively, the array 111 may be formed as a solid, for example, by extrusion to provide a closed joint along each edge 133. The edge 133 may alternatively be formed by bending a single piece of material such that the angled walls 131*a* and 131*b* are formed from the single piece of material. In another alternative, the optical array may be formed in a plastic mold such that the entire optical array 111 is a single piece. The angled walls 131*a* and 131*b* shown in FIG. 1A illustrate a two-dimensional view of the optical array support 130. In FIG. 1B, a three-dimensional view of optical array supports 130 shows the pyramidal volume formed by the intersections of two horizontal angled walls and two angled vertical walls.

The optical array supports 130 may be formed by molding, drilling, or formed during the metal fabrication (e.g., bending, bonding and/or welding) of the angled walls 131*a* and 131*b*. One method to manufacture these structures is to make an injection molded part in plastic with high quality surface smoothness, and then metallizing the optical array 111 using a low temperature sputtering process to evenly coat a metal such as aluminum. Alternative coatings/metals/processes could be used to provide a highly specular reflective surface for the optical array 111.

When the apparatus 100 is incorporated into a luminaire (explained in more detail with reference to other examples), the optical array cavities 130 facilitate the inclusion of the additional light emitters, such as display light emitters 121*x-n*, into the apparatus 100. In an example, the optical array cavity 130 may have a height h that is measured from the edge 133 formed by two angled walls to a plane of the open base 139. In some examples, the height h may be approximately 7 millimeters (mm), while, in other examples, the height may be approximately 4-5 mm or the like. The width W of the optical array cavity 130 at the open base 139 may be approximately 3 mm, however, in other examples, the width W may be approximately 1-2 mm, 3-4 mm, fractions thereof or the like. For example, unless expressly stated otherwise, a parameter value or the like may vary by as much as ±10% from the "approximately" stated amount in this and the following examples.

The shapes of the optical passages 113 and the optical array 111 are shown in FIG. 1B as square-shaped. The optical passages 113, however, may be formed in the shape of diamonds, triangles, other polygons, circles, ovals, or a combination of different shapes. Each optical passage 113 has a passage output 137 coupled to the optical aperture 190. Variations in the shapes of the passages 113 may result in variations in shapes of the passage outputs 137 and complementary variations in shapes area of the open bases 139 of the optical array cavities 130 that form the shadow regions 136 that extend outward from the optical aperture 190.

When organized in a square grid configuration may the row grid structure 117 and the column grid structure 118 form a number of near-field shadow regions (FIG. 1B), such as row open base 133, column open base 134 and shadow region 136 (which is at the intersection of the structural rows and columns of the optical array 111). A near-field shadow region, such as 133, 134 and 136, is an area in close proximity to optical aperture 190 of the apparatus 100 of relative darkness that is being screened or blocked from receiving a substantial portion of the directed general illumination light by the reflective grid walls 131 that form the adjacent optical passages 113 through the optical array 111. As mentioned above, a near-field shadow region, such as 134, 135 or 136, is in close proximity to the apparatus 100. A far-field region is considered an area, such as a task surface or a portion of a wall in a wall wash application. If the region includes a shadow, the far-field shadow region, for example, may be a region at the illumination application distance where general illumination light may be screened or blocked. The configuration of the optical array 111, in this example, enables the display light board 175 to not only be transparent, but also to have a suitable thickness that allows for easier manufacturability since the board 175 is not so thin as to be fragile.

The open base 139 of the optical array cavity 130 is opposite the edge 133. The intersections of the open bases 139 of a horizontal optical array cavity 130 and a vertical optical array cavity correspond to the intersections of a row open base 135 and a column open base 134. The open base intersection 133 in turn creates a shadow region 136, and these base intersections 133 are configured to contain the additional light emitters, 121x-n. In the plan view shown in FIG. 1B, the apparatus 100 is shown with a display light board 175 that includes additional light emitters 121x to 121n, generally shown as display light emitters 121, mounted at open bases 139 corresponding to near-field shadow regions 136 of the optical array 111. The configuration of the display light board 175 will be explained in more detail with reference to another example.

Figure 7:
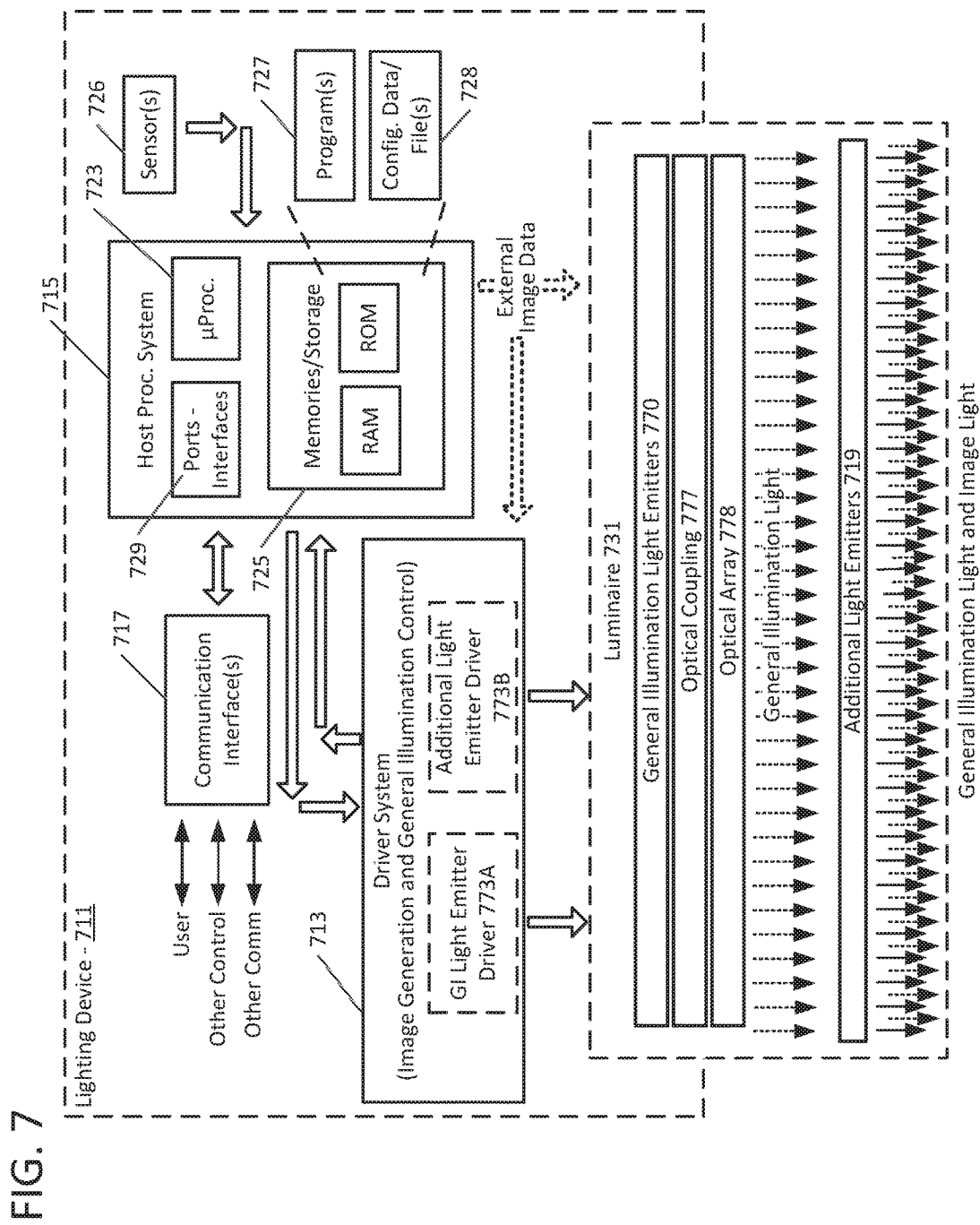
FIG. 7 is a high-level functional block diagram of an example of a lighting device including a luminaire utilizing one or more apparatuses, examples of which are shown in the FIGS. 1-6.

The additional lighting emitters 121 are oriented to emit additional light into the space to be illuminated. The additional lighting emitters 121 may extend though the optical aperture 190. It is also envisioned that one or more of the additional light emitters 121 may provide, depending on the particular general illumination lighting or display application, light for the display of an image and/or light for general illumination. The additional light emitters 121 may be coupled to a substrate 123 as part of the display light board 175 to maintain the positioning of the individual light emitters and/or to provide areas for layout of circuitry and circuit paths. The circuitry and the circuity paths (not shown in this example) may be coupled to a controller or control system (as shown in the examples of FIGS. 7 and/or 8). In the described examples, the additional light emitters 121 of apparatus 100 are display light emitters that are configured to present pixels of a display for the presentation of an image. For example, the apparatus 100 may be configured to simultaneously output display light to present a portion of an image via the additional light emitters 121 and emit general illumination light via the general illumination light source 101.

FIG. 1B also shows that the optical array 111 may be formed in a shape of a grid. For example, a row grid structure 117 and a column grid structure 119 may form a square or rectangular grid of the optical array 111. In this example, the row grid structure 117 forms a row open base 135 and the column grid structure 119 forms a column open base 134. Where the two open bases 135 and 134 meet an open base intersection 133 is created. The open base intersection 133 in turn creates a shadow region 136 that occludes the general illumination light. Each of the column open base 134 and the row open base 135 also have associated shadow regions that occlude the general illumination light emitted by the general light by the general light emitter 101, but that are not shown for ease of illustration. The near-field shadow region 136 are created in this particular example of FIGS. 1A-1C by, in this case, the triangular shaped row grid structure 117 and column grid structure 118 and their respective row-and-column intersections 133. For example, each shadow region 136 is an area corresponding to one of the number of optical array cavities 103. In this example, the optical array supports 130 are square portions formed at the row-and-column intersections of a triangular shaped row grid structure 117 member and a triangular shaped column grid structure 118 member, and the shadow region 136 is formed beneath the open base 139 of the optical array support 130. For example, the display light emitters 121x on the display light board 175 may be positioned beneath, or be aligned to correspond with a respective optical array support 130 to not occlude or block any of the general illumination light. The display light board 175 may be substantially transparent to allow the light output from the passage outputs 137 of the optical array 111.

The configuration of the optical coupling 103 together with the configuration of the optical passages 113 through the optical array 111 define a distribution 110 of general illumination light as shown in FIG. 1C output of the apparatus 100 into the illuminated space. In one or more examples, the general illumination light distribution 110 output from the optical passages 113 includes approximately 90% or more of the general illumination light emitted by the general illumination light source 10. In other examples, the general illumination light distribution 110 may include approximately 80%, 85%, 95% or 98% of the general illumination light emitted by the general illumination light source 101. Unless expressly stated otherwise, a parameter value, such as the general light distribution percentage of the general illumination light emitted or the like, may vary by as much as ±10% from the "approximately" stated amount in this example.

The shadow region 136 is also shown in FIG. 1C. As can be seen, the light distribution does not fill the area of the shadow region 136 beneath the display light emitter 121x due to the configuration of the optical array 111.

Figure 2A:
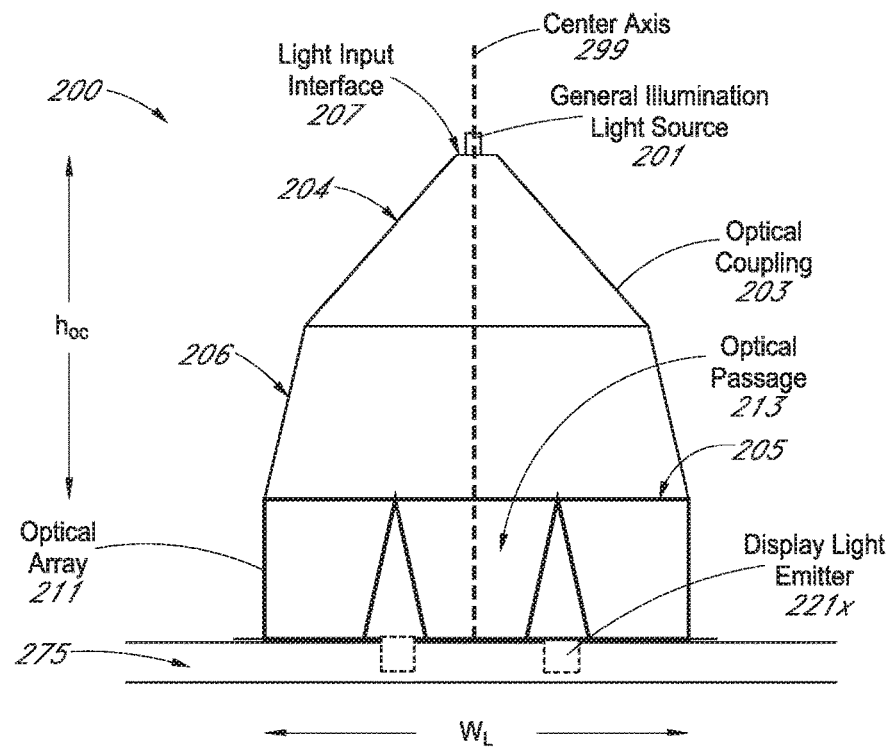
FIG. 2A illustrates a cross-sectional view of an apparatus that incorporates an example of a particular form of an optical coupling, such as a faceted optical coupling.

FIG. 2A illustrates a cross-sectional view of an apparatus that incorporates an example of another form of optical coupling, such as a faceted optical coupling. The apparatus 200 is configured similarly to the apparatus 100 of FIGS. 1A-1C. For example, similar to the apparatus 100, the apparatus 200 includes a general illumination source 201, an optical coupling 203, and an optical array 211. The general illumination light source 201 and the optical array 211 may be substantially the same as the general illumination light source 101 and optical array 111 of FIGS. 1A-1C. Therefore, a detailed discussion of these similar features of the apparatus 200 has been omitted. The reader is directed to the discussion of the general illumination light source 101 and optical array 111 of FIGS. 1A-1C for additional details. The optical coupling 203 in the example of FIGS. 2A and 2B includes a light input interface 207 and a light output interface 205. The optical coupling 203 has a center axis 299 about which are centered the light input interface 207 and a light output interface 205.

Figure 2B:
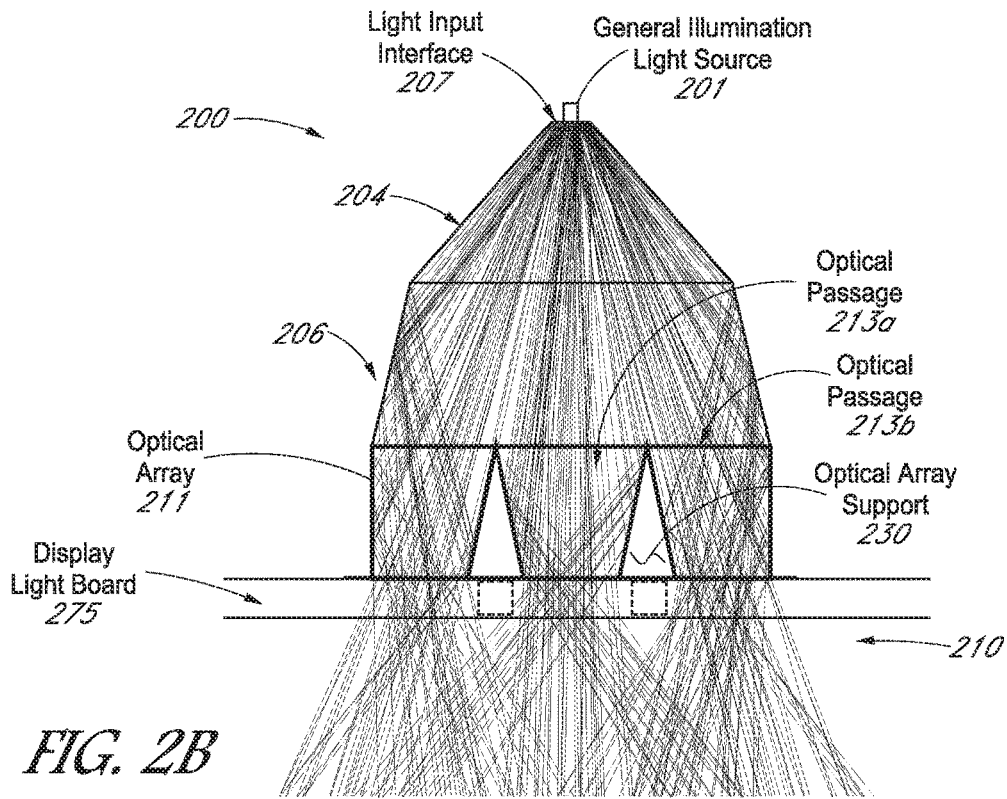
FIG. 2B illustrates a simplified ray trace example of the flow of the general illumination light through to the output distribution of the apparatus example shown in FIG. 2A.

With reference to FIGS. 2A and 2B, the optical array 211 is coupled to the output interface 205 of the optical coupling 203. The optical array 211 includes a number of optical passages 213 and a number of optical array supports 230. Each optical passage 213 is configured to direct a portion of the light received from the light output interface 207 toward an output of the optical passage. The optical array supports 230 are in between adjacent optical passages, such as 213a and 213b of the plurality of optical passages 213. The optical array 211 may also include optical array cavities 230. Display light emitters 221x may be positioned near the optical supports 230 so as to not occlude or block any of the general illumination light emitted by the general illumination light source 201 from behind the display light emitters 221x. For example, the display light emitters 221x on the display light board 275 may be positioned beneath, or be aligned to correspond with a respective optical array support 230 to not occlude or block any of the general illumination light. The display light board 275 may be substantially transparent to allow the light output from the optical passages 213 of the optical array 211. As shown in FIG. 2A, the optical coupling 203 is a faceted optical coupling that may be viewed as having two stages. The first stage of the optical coupling 203 is formed by a first surface area 204 closest to and surrounding light input interface 207, and centered about the center axis 299 of the optical coupling 299. The second stage is formed by a second surface 206 closer to the light output interface 205 than the first surface 204. The second surface 206 surrounds the light output interface 205 and is centered about the center axis 299. The first surface 204 makes a conical shape of the optical coupling 203 that has a first angle with respect to the center axis 299 of the optical coupling 203. The second surface 206 forms a conical frustum shape of the optical coupling 203 near the light output interface 205. While the discussion refers to a first surface 204 and a second surface 206, the two surfaces 204 and 206 may be a single continuous piece of material, such as aluminum, reflective film over a base material for rigidity or the like.

The angles of the first surface 204 with respect to the center axis 299 is less than the angle of the second surface 205 with respect to the center axis 299. In addition, the optical coupling has a height $h_{OC}$, such as approximately 24 mm, that in combination with the respective angles of the two surfaces 204, 206 directs the general illumination light toward the light output interface 205 with a light distribution intended to direct approximately 100% of the light emitted to the light output interface 205. Due to the configuration of the optical array 211 to allow space for the positioning of the display light emitters 221x in the array optical array supports 230, some of the light output from the light output surface 205 is blocked or occluded, or simply misdirected. The optical array 211 has a width $W_L$, such as approximately 21 mm, that couples to light output surface 205.

FIG. 2B illustrates an example of the general illumination output light distribution of the example of the apparatus 200 shown in FIG. 2A. The general illumination light source 201 outputs general illumination light over a broad distribution such as, for example, 120 degrees. The faceted optical coupling 203 in combination with the optical array 211 is configured to emit the general illumination light with an approximate efficiency of 90% and have a smoothed light distribution of approximately ±40 degrees.

Figure 3B:
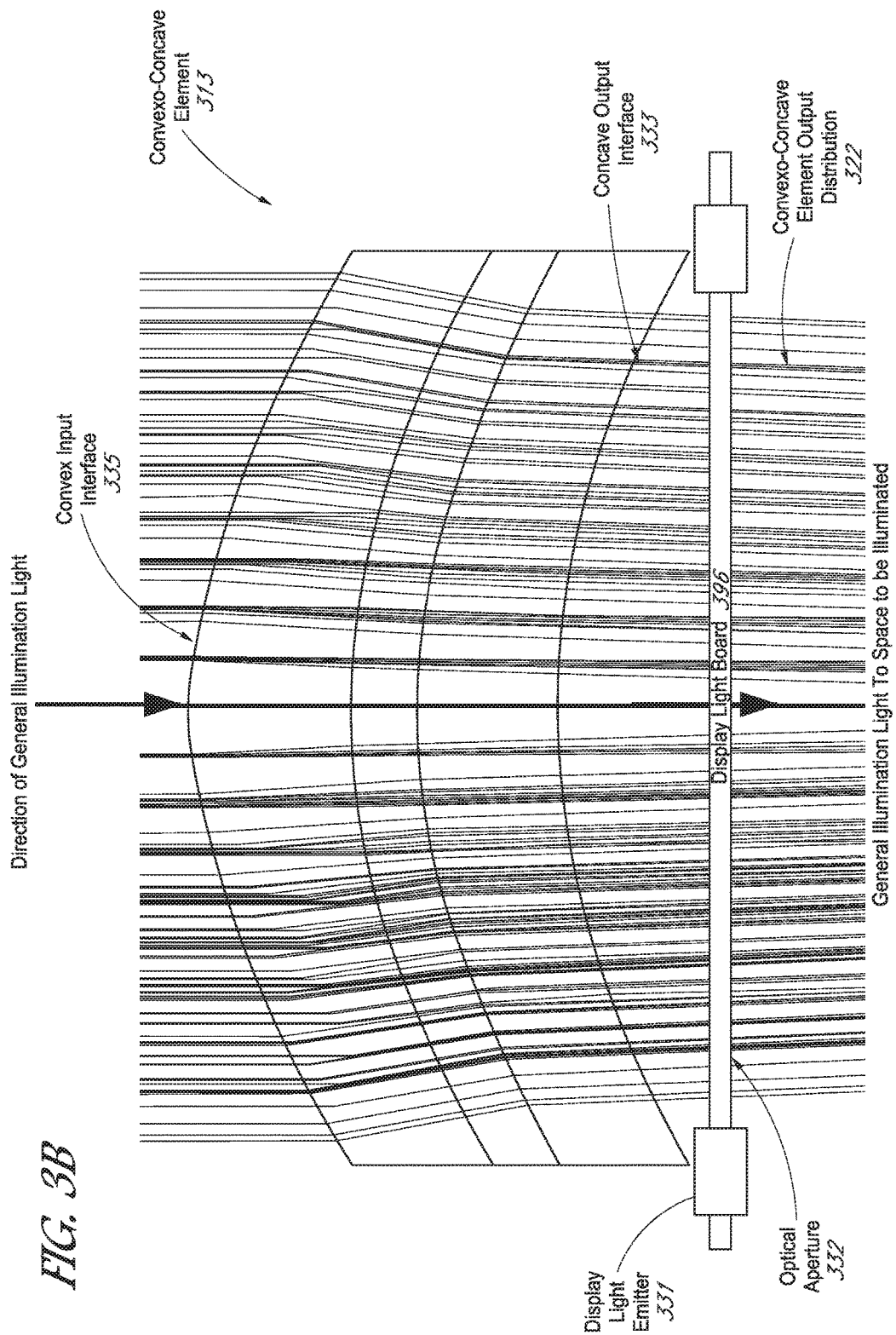
FIG. 3B illustrates a cross-sectional view with simplified ray tracing of the general illumination light distributed through one of the convexo-concave lenses from the apparatus example illustrated in FIG. 3A.

FIG. 3A illustrates a cross-sectional view of yet another example of an apparatus 300 that includes an optical array 311 utilizing a number of convexo-concave lenses. FIG. 3B illustrates a cross-sectional view of the light distribution through one of the convexo-concave lens from the apparatus illustrated in the examples of FIG. 3A. In the example, the optical array 311 includes a number of convexo-concave optical elements 313 optically coupled to the light output interface 305 of the optical coupling 303. When configured as part of a luminaire (described with respect to other examples), a display light board 396 that includes a set of display light emitters 331x and optical apertures 332 may be positioned beneath the optical array 311. The set of display light emitters 331 are configured, in response to control signals, to output an image. The optical apertures 332 are transparent regions adjacent to the display light emitters 331.

As shown in FIG. 3A, the edges of adjacent convexo-concave optical elements 313 meet at approximately the center of the display light emitter 331 of the display light board 396, when the apparatus 300 is incorporated in a luminaire. Each of the convexo-concave optical elements 313 is configured to collimate light received at a convex input interface 335 of the convexo-concave optical element 313 and output the collimated light from the concave output interface 333. The display light board 396 in addition to including the display light emitters 331, also includes transparent optical apertures 332 to permit light output from the concave output interface 333 to pass through the display light board 396. The convexo-concave optical element 313 is configured to shift the incident general illumination light laterally toward the center of the convexo-concave optical element 313 to allow a substantial amount of the incident light to pass around the display light emitter 331. The optical principle of the convexo-concave optical element 313 use a higher index of the lens material compared to ambient air as well as the thickness of the lens to generate a lateral shift of the light. The lateral shift distance is determined by both the thickness of the lens and the curvature of the convex surface. The curvature of convex and concave surface does not need to be the same. The curvature of the concave surface depends on the output beam angle requirement of the particular lighting and/or image display application of the apparatus 300. The light output, such as convexo-concave element distribution 322 of FIG. 3B from the concave output interface 333 is directed toward the apparatus optical output aperture 390 for transmission to the space to be illuminated. As shown in FIG. 3B, the configuration of the convexo-concave optical element 313 directs the general illumination light as convexo-concave element distribution 322 around the display light emitters 331. This results in a near-field shadow region beneath the display light emitter 313. The lateral shift of the general illumination light avoids the display light emitter 331, and as a result more of the incident light is passed through the optical aperture 332 in the display light board 396 to the space to be illuminated because the light is neither blocked or absorbed by the display light emitter 331. For example, an apparatus that utilizes an optical array configuration that includes convexo-concave optical elements 313 may enable approximately 80% or more of the general illumination light to pass to the space to be illuminated versus less than approximately 70% output from an apparatus utilizing only the optical coupling 303 and the display emitters 313.

Figure 4:
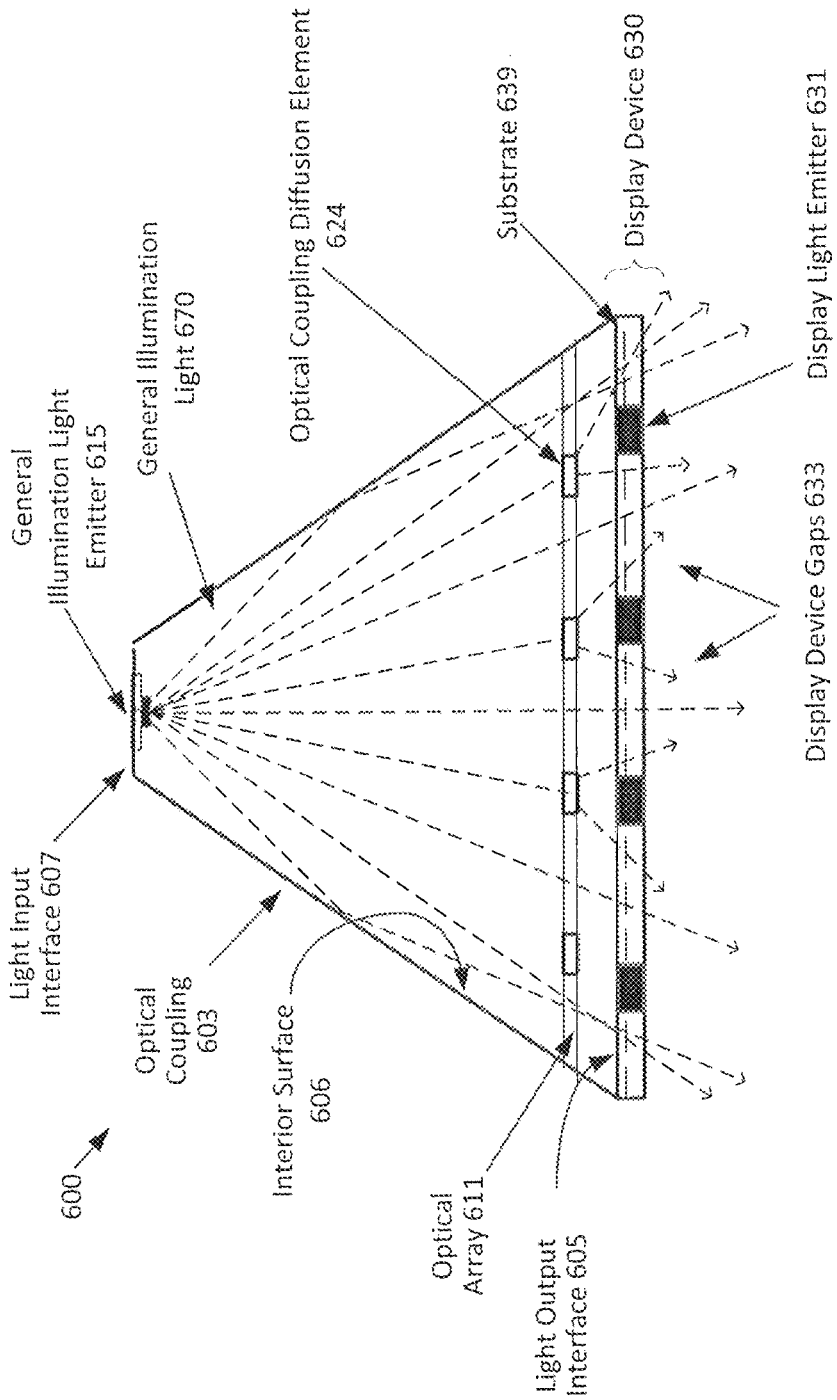
FIG. 4 is another example of an apparatus including a general illumination light source, and an optical coupling.

Other implementations of optical arrays that are internal to the optical coupling are also envisioned. For example, FIG. 4 is example of another apparatus including a general illumination light source, an optical coupling and a display lighting board. Similar to the apparatus examples of FIGS. 1A-3B, the apparatus 600 includes a general illumination light emitter 615, an optical coupling 603 and a display device 630. The general illumination light emitter 615 performs a similar function as the general light emitters of previous examples as described with reference to FIGS. 1A-3B.

The display device 630 may be formed on a substrate 639 that holds the display light emitters 631 in position, and also provides support for circuit paths to the individual display light emitters 631 from a controller or processor. The display light emitters 631 are arranged at positions on the substrate 639 at a predetermined pixel pitch (i.e., a distance measured from the center of a first light emitter to the center of an immediately adjacent light emitter), such as approximately 6 mm to 10 mm. In the area between the display light emitters 631 and the substrate 639 are display device gaps 633 that may be transparent areas that enable general illumination light to be passed through to the space to be illuminated. The optical coupling 603 includes a light input interface 607, a light output interface 605 and an optical array 611. In addition, the optical coupling 603 has an interior surface 606 that may be a metallic surface, such as aluminum or other surface that has no reflective coating or other coating that does not absorb light. Alternatively, the interior surface 606 may be a reflective surface that aids in the direction and re-direction of the light toward the optical array 611 and the light output interface 605 of the optical coupling 603.

The optical array 611 may be formed using a patterned prismatic film, or the like, to deflect the general illumination light around the display light emitter 631 into display device gaps 633. The optical array 611 may include one or more optical coupling diffusion elements 624 that are configured to direct incident general illumination light input to the respective optical coupling diffusion element 624 around the display light emitter 631.

Due to the redirection of the general illumination light 670 around the display light emitter 631, the amount of general illumination light blocked by the display light emitters 631 is reduced.

FIG. 5A is a view of an example of a luminaire comprising an apparatus such as that shown in the examples of FIGS. 1A-4 from the space being illuminated by the luminaire. The luminaire 400 includes a number of display light emitters 431, a grid structure 407 having a number of transparent regions 405, and a number of apparatuses 410. In the example of FIG. 5A, the number of transparent regions 405 may be arranged in the shape of a square matrix formed by the rows 441 and columns 443 of the grid structure 407. In the particular example of FIG. 5A, the rows and columns of the grid structure 407 form a 9 by 9 matrix of transparent regions 405. Alternatively, the grid structure 407 may be in the form of other shapes, such as circles, ovals, diamonds, triangles, or other polygons, or combinations of shapes, such as circles and diamonds.

Figure 5B:
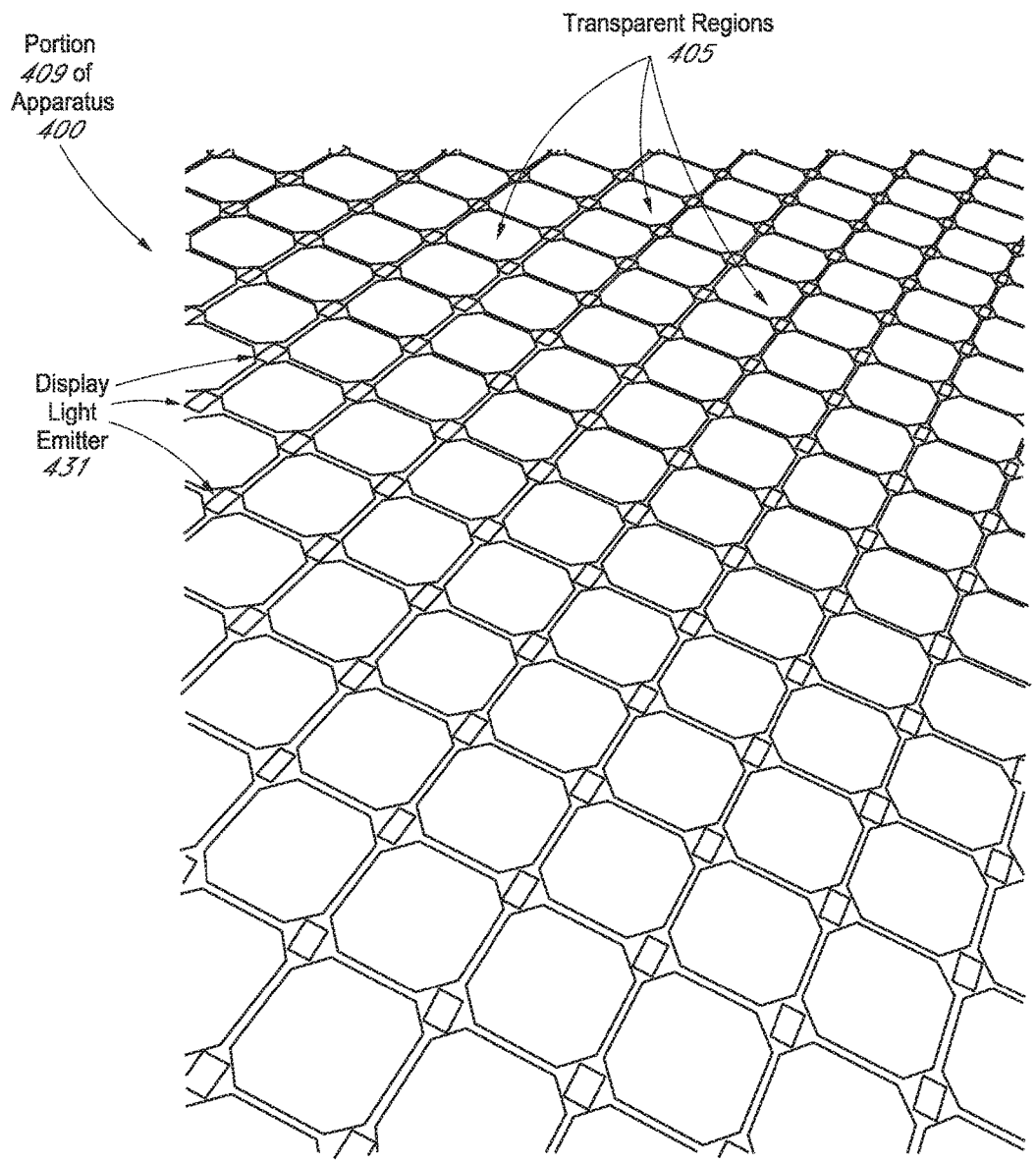
FIG. 5B is a partial plan view of an example of a luminaire such as that shown in FIG. 5A showing a positioning of the display light emitters and the output apertures.

The display light emitters 431 may be positioned at the intersections of the grid structure rows 441 and columns 443. In the example of FIGS. 5A and 5B, the display light emitters 431 may be positioned at the intersections of the grid structure rows 441 and columns 443 and be approximately 8 millimeters (mm) apart, which equates a display pixel pitch PD of 8 mm for the display light emitters. Of course, the positioning of the display light emitters 431 may be different or may be dynamically configurable by using all or less than all of the display light emitters 431 to present an image.

In the examples of FIGS. 5A and 5B, the transparent regions 405 of the luminaire 400 are configured to provide general illumination light to the space to be illuminated using examples of the apparatus 410 described in FIGS. 1A-4. In the particular example of the luminaire 400, the apparatus is configured with an optical array that is coupled to the grid structure 407 such that the optical passages (denoted by the X in the center portion of the transparent regions 405) of the optical array 411 of the apparatus 400 are aligned with a transparent region 405 of the grid structure 407. The apparatus 410 as shown by the optical array boundary 411 covers, in this example, an area of 3 by 3 transparent regions 405 of the luminaire 400 with the general light emitter 415 in the center of the 3 by 3 area. Of course, the area of transparent regions 405 is not limited to 3 by 3, but may be N by N, where N is an integer. In addition, the configuration of apparatuses and the grid structure 407 is to allow blending of the general illumination light with the display image light. The general illumination light emitters 415 also have a pixel pitch (PGI) of approximately 32 mm. In the example, the display light emitters 431 have a pitch PD of approximately 8 mm and the general illumination light emitters 415 have a pitch that is 4 times PD. The pitch PGI is measured from a center of a general illumination light emitter to a center of a next general illumination light emitter. Of course, another general illumination pixel pitch PGI may be used based on the configuration of the apparatus 410. Although in the specific example of FIG. 5A a 3 by 3 array is shown, a 4 by 4 array of transparent regions minimizes the border region of the illumination emitters and thus any dark areas between the different illumination regions.

The apparatus grid structure 407 aligns the display light emitters 431 with the optical array of the apparatus 410 such that the substrate display emitters 431 and their respective circuitry may protrude into the open base of optical array cavities, such as 139 of optical array cavity 103 of FIG. 1A, to provide concealment of the circuitry and also minimize the amount of display emitter 431 structure that may potentially extend into and block the light distribution of the general illumination light directed to the space to be illuminated.

FIG. 5B is a partial plan view of an example of a luminaire comprising an apparatus such as that shown in FIG. 5A showing a positioning of the display light emitters and the transparent regions. As shown in the portion 409 of the apparatus 400 in the example of FIG. 5B, the size of display emitters 431 and 8 mm pixel pitch of the display light emitters 431 enables the transparent regions 405 to account for approximately 80% of the area of the luminaire 400. As a result, the luminaire 400 has the light output efficiency to provide general illumination meeting governmental and/or industry standards for a selected light distribution and also provide either separately or simultaneously, presentation of an image or video from a display device formed from the display light emitters 431.

Figure 6:
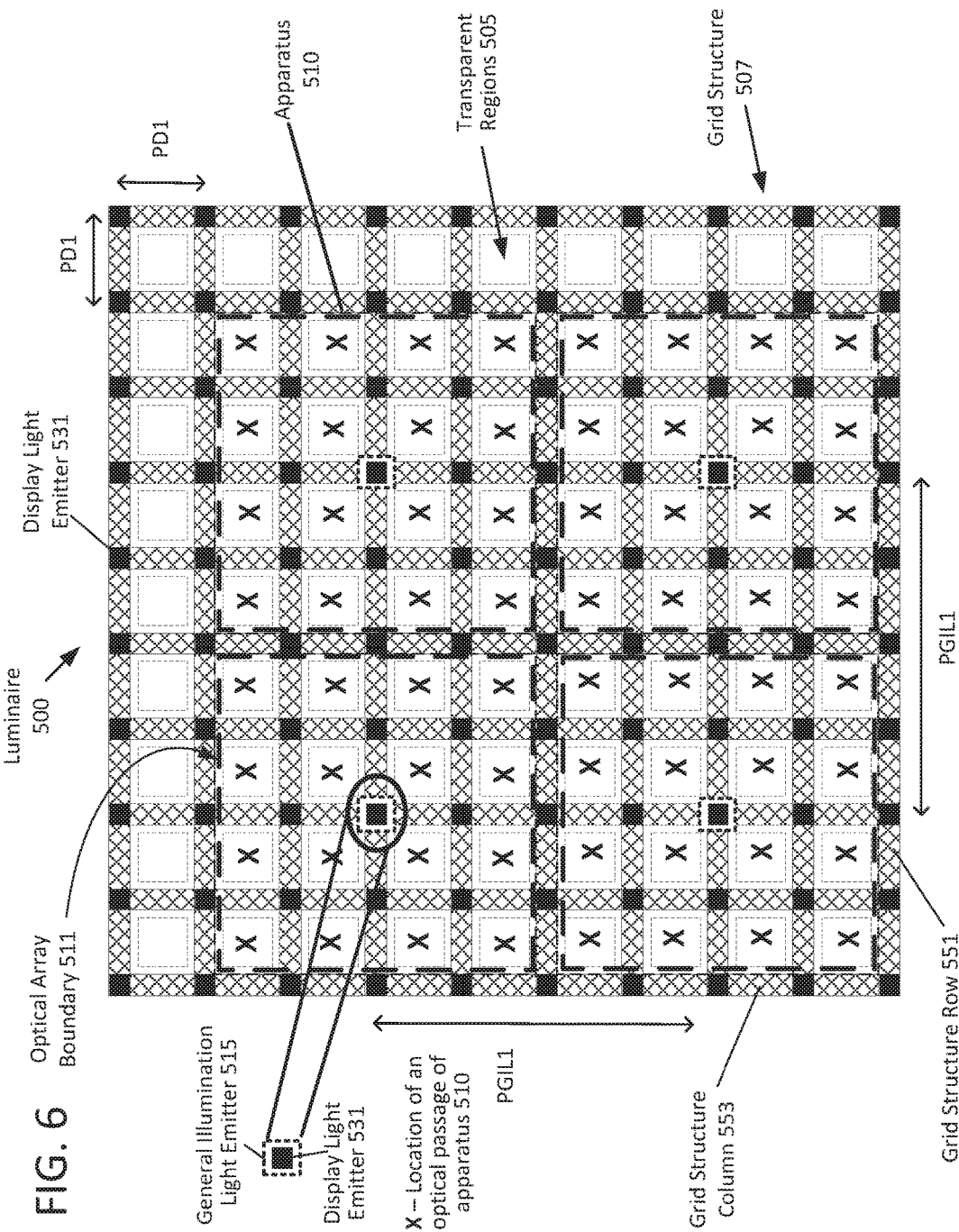
FIG. 6 is a front view of another example of a luminaire comprising a number of apparatuses, each of which may be implemented using any of the examples shown in FIGS. 1A-4.

FIG. 6 is a view of another example of a luminaire comprising an apparatus such as that shown in the examples of FIGS. 1A-4 from the space being illuminated by the luminaire.

In the example of FIG. 6, the luminaire 500 includes a grid structure 507, apparatuses 510, and a display device that includes a number of display light emitters 531.

In the luminaire 500 of the example of FIG. 6, there are four apparatuses 510 adjacent to one another in the form of a square. The respective general illumination light emitter pitch (PGIL1) in the FIG. 6 example is approximately 30-34 mm, and the display light emitter pitch (PD1) is approximately 6-10 mm. The apparatuses 510 are configured as 4×4 square matrices (as shown by the optical array boundary 511) with a general illumination light emitter 515 positioned directly above an optical array support of the apparatus's optical array that may contain a display light emitter 531 (as shown in the isolated view to the left of the luminaire 500). The apparatus 510 includes a number of optical passages (labeled with X) centered above the transparent regions 505 of the luminaire 500.

Due to the alignment of the optical passages (shown at X) of the apparatus 510, the general illumination light produced by the general illumination light emitter 515 is directed around the display light emitters 531 and the grid structure rows 551 and columns 553 to provide general illumination meeting governmental and/or industry standards for a selected light distribution, and also provide, either separately or simultaneously, presentation of an image or video from a display device formed from the display light emitters 531 to the space in which the luminaire 500 is located. Other structural details such as grid structure rows 551 and columns 553 are substantially similar to those described with reference to FIGS. 5A and 5B; therefore, a detailed discussion is omitted and the reader is referred to the discussion of FIGS. 5A and 5B.

FIG. 7 is a high-level functional block diagram of an example of a lighting device including an apparatus as shown in the examples of FIGS. 1-6, as part of a luminaire that displays an image and a general illumination device that provides general illumination lighting.

For illustration and discussion purposes, the luminaire 731 includes one or more general illumination light emitters 770, one or more optical couplings 777 and additional light emitters 719. Each optical coupling 777 includes an optical output interface (not shown in this example) and is coupled to an output of a corresponding one of a general illumination light emitter of the array 770. The optical coupling 777 outputs from the optical output interface a substantial portion of the general illumination light received via an output of the corresponding general illumination light emitter. The optical coupling 777 is aligned with the optical array 778 as described above in the discussion of the examples of FIGS. 1A-6.

The luminaire 731 of the lighting device 711 also includes additional light emitters 719 may be coupled to a display light board, such as 175 of FIGS. 1A-C, 275 of FIGS. 2A and 2B, or 396 of FIG. 3B. Each additional light emitter of the additional light emitters 719 is controllable via couplings to the host processing system 715 to emit image light for a respective pixel of an image to be displayed. In addition, or alternatively, the image data may be provided to the additional light emitters 719 from an external source(s) (not shown), such as a remote server or an external memory device via one or more of the communication interfaces 717. The general illumination light emitters 770 are configured to generate general illumination light that provides general illumination to the space in which the lighting device 711 is located for lighting and/or image display functions.

Additional details of all of the components, functions and structures of luminaire 731 may be similar to the respective components, functions and structures described with reference to the examples of FIGS. 1A-6, and therefore, a detailed discussion of those respective components, functions and structures has been omitted in the following discussion of FIG. 7.

The functions of elements 770, 777, 778 and 719 are controlled by the control signals (e.g., illumination emitter drive signals, image light emitter drive signals, and possibly electrowetting signals) received from the driver system 713. The driver system 713 may be an integral unit generating appropriate drive signals for operation of the light emitter array(s) 719, 770 and any other controllable components of the luminaire 731 and of the additional light emitters 719. As illustrated, the driver system 713 may include a general illumination light emitter driver 773A coupled to provide drive signal(s) to operate the general illumination light emitter(s) of the general illumination light emitters 770 and a separate additional light emitter driver 773B to provide drive signals to operate the additional light emitters 719. The controllable general illumination light emitter driver 773A may provide signals to control the actual emitter component(s) of the general illumination light emitters 770 in response to control signals from the host processing system 715. The additional light emitters 719 may receive image signals from the image light emitter driver 773B based on control signals or image data from host processing system 715. For example, each of the display light emitters, such as 431 of FIG. 5A, may be individually controllable to allow certain ones of the display light emitters 431 to function as a display device to provide a display of an image or a video, to function as a general illumination light source, or not provide any output light.

Light from the general light emitters(s) 770, optical coupling 777, and optical array 778 forming the luminaire 731 alone or in combination with image output light from the image light emitter array 719 provides general illumination lighting that complies with governmental building codes and/or industry lighting standards, such as Occupational safety and Health Administration (OSHA), Illuminating Engineering Society (IES) and American National Standards Institute (ANSI) standards for providing lighting for a lighting purpose within the space, such as task lighting, reading light, exit illumination or the like. The additional light emitter 719, in the example, is located proximate to the general illumination light emitting array 770 as described in previous examples. The additional light emitter 719 is configured to output image light for presentation to the space in which the luminaire 731 is illuminating with general illumination light. The presented image may be a real scene, a computer-generated scene, a single color, a collage of colors, a video stream, animation or the like. The controllable general illumination light emitters 770 of luminaire 731 includes one or more light emitters that provide general illumination that satisfies the governmental building codes and/or industry lighting standards.

As shown in FIG. 7, the example of the lighting device 711 includes a host processing system 715, one or more sensors 726 and one or more communication interface(s) 717.

The host processing system 715 provides the high-level logic or "brain" of the lighting device 711. The host processing system 715 upon execution of programming code may be configured to perform the functions of processor 723, such as those described above with reference to FIGS. 2-5. In the example of FIG. 7, the host processing system 715 includes data storage/memories 725, such as a random-access memory and/or a read-only memory, as well as programs 727 stored in one or more of the data storage/memories 725. The programs 727 may include image presentation and/or processing programs that enable the host processing system 715 to perform the image presentation mentioned above. The data storage/memories 725 store various data, including information about the additional light emitter 719, lighting device configuration/image data/files 728 or one or more configuration/image data files containing such information, in addition to the illustrated programming 727. The image files 728 may be an image source from which the host processing system 715 obtains image data for presentation as an image output from the image light emitter array 719. The host processing system 715 also includes a central processing unit (CPU), shown by way of example as a microprocessor (μP) 723, although other processor hardware may serve as the CPU.

The ports and/or interfaces 729 couple the processor 723 to various elements of the device 711 logically outside the host processing system 715, such as the driver system 713, the communication interface(s) 717 and the sensor(s) 726. For example, the processor 723 by accessing programming 727 in the memory 725 controls operation of the driver system 713 and other operations of the lighting device 711 via one or more of the ports and/or interfaces 729. In a similar fashion, one or more of the ports and/or interfaces 729 enable the processor 723 of the host processing system 715 to use and communicate externally via the interface(s) 717; and the one or more of the ports 729 enable the processor 723 of the host processing system 715 to receive data regarding any condition detected by a sensor 726, for further processing.

In the operational examples, based on its programming 727, the processor 723 processes data retrieved from the memory 723 and/or other data storage, and responds to light output parameters in the retrieved data to control the illumination and display light generation and optionally the light distribution from luminaire 731. The light output control also may be responsive to sensor data from a sensor 726. The light output parameters may include light intensity and light color characteristics of light from light emitter array 770.

As noted, the host processing system 715 is coupled to the communication interface(s) 717. In the example, the communication interface(s) 717 offer a user interface function or communication with hardware elements providing a user interface for the lighting device 711. The communication interface(s) 717 may communicate with other control elements, for example, a host computer of a building control and automation system (BCAS). The communication interface(s) 717 may also support device communication with a variety of other equipment of other parties having access to the lighting device in an overall lighting system, e.g. equipment of the manufacturer of lighting device 711 for maintenance or an on-line server for downloading of programming instruction or configuration data for setting aspects of luminaire operation. The communication interface(s) 717 may also receive images for presentation by the additional light emitter 719. The received images may require transformation as described previously, or may not. In an alternative example, the additional light emitters 719 may be controlled to supplement the general illumination light output by the general illumination light emitters 770.

In an example of the operation of the lighting device 711, the processor 723 receives a configuration file 728 via one or more of communication interfaces 717. The processor 723 may store, or cache, the received configuration file 728 in storage/memories 725. In addition to the configuration file 728, the processor 723 may obtain from the storage/memories 725 or a remote device via the communication interfaces 717 an image for display by the additional light emitters 719. A memory 725 may store an image for display by the image light emitter array 719. Alternatively, the configuration file 728 may also include data that indicates, for example, an image for display by the image light emitter array 719 as well as lighting settings for light to be provided by the luminaire 731. Each configuration file may also include one or more general illumination settings to set the light output parameters of the lighting device 711, at least with respect to one or more operational parameters for the controllable general illumination light emitter array 770.

Using the data indicating the image to be obtained from the storage/memories 725, the processor 723 may retrieve from the storage/memories 725 an image for presentation by the image light emitter array 719. The processor 723 delivers the image data to the driver system 713. The driver system 713 using, for example, optional additional light emitter driver 773B may deliver the image data directly to the additional light emitter array 719 for presentation or may have to convert the image data into a signal or data format suitable for delivery to the additional light emitter 719. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like. For example, if floating point precision is needed, options are available, such as OpenEXR, to store 32-bit linear values. In addition, the hypertext transfer protocol (HTTP), which supports compression as a protocol level feature, may also be used.

A controllable lighting device such as 711 may be reconfigured, e.g. to change the image display output and/or to change one or more parameters to the illumination light output by changing the corresponding aspect(s) of the configuration data file 728, by replacing the configuration data file 728, retrieving different image data from memory 725, or by selecting a different file from among a number of such files already stored in the data storage/memories 725.

In other examples, the driver system 713 including optional general illumination (GI) light emitter driver 773A and optional additional light emitter driver 773B is coupled to the memory 725, the additional light emitter array 719 and the general illumination light emitter 770 to control light generated by the additional light emitter array 719 and the general illumination light emitter 770 based on the configuration data 728 stored in the memory 725. In such an example, the driver system 713 is configured to directly access configuration data 728 stored in the memory 725 and generate control signals for presenting the image on the image light emitter array 719 and control signals for generating light for output from the luminaire 731.

Equipment implementing functions like those of configurable lighting device 711 may take various forms. In some examples, some components attributed to the lighting device 711 may be separated from the controllable general illumination light emitter array 770 and additional light emitter array 719 of the luminaire 731. For example, a lighting device may have all of the above hardware components on a single hardware device as shown or in different somewhat separate units. In a particular example, one set of the hardware components may be separated from one or more instances of the controllable luminaire 731, such that the host processing system 715 may run several luminaires having displays, illumination light sources and possibly modulators from a remote location. Also, one set of intelligent components, such as the microprocessor 723, may control/drive some number of driver systems 713 and associated controllable luminaires 731. It also is envisioned that some lighting devices may not include or be coupled to all of the illustrated elements, such as the sensor(s) 726 and the communication interface(s) 717.

In addition, the luminaire 731 of each lighting device 711 is not size restricted. For example, each luminaire 731 may be of a standard size, e.g., 2-feet by 2-feet (2×2), 2-feet by 4-feet (2×4), or the like, and arranged like tiles for larger area coverage. Alternatively, one luminaire 100 may be a larger area device that covers a wall, a part of a wall, part of a ceiling, an entire ceiling, or some combination of portions or all of a ceiling and wall.

Lighting equipment like that disclosed in the example of FIG. 7, may have alternate configurations that combine the general illumination light sources with image display device emitters to provide general illumination and image light. The general illumination output from the combined general illumination light sources and image display device emitters for an intended area of a space meets the governmental and/or industry standards, e.g. OSHA, IES, or ANSI, described above for the intended area.

A number of the lighting devices and/or luminaires of any of FIGS. 1A-7 may be utilized as components of an overall lighting system. An example of a system utilizing software configurable lighting devices has been described in U.S. patent application Ser. No. 15/198,712, filed Jun. 30, 2016, entitled "Enhancements Of A Transparent Display To Form A Software Configurable Luminaire," the entire contents of which are incorporated herein by reference. U.S. patent application Ser. No. 15/198,712 is assigned to the Applicant of the present application.

Figure 8:
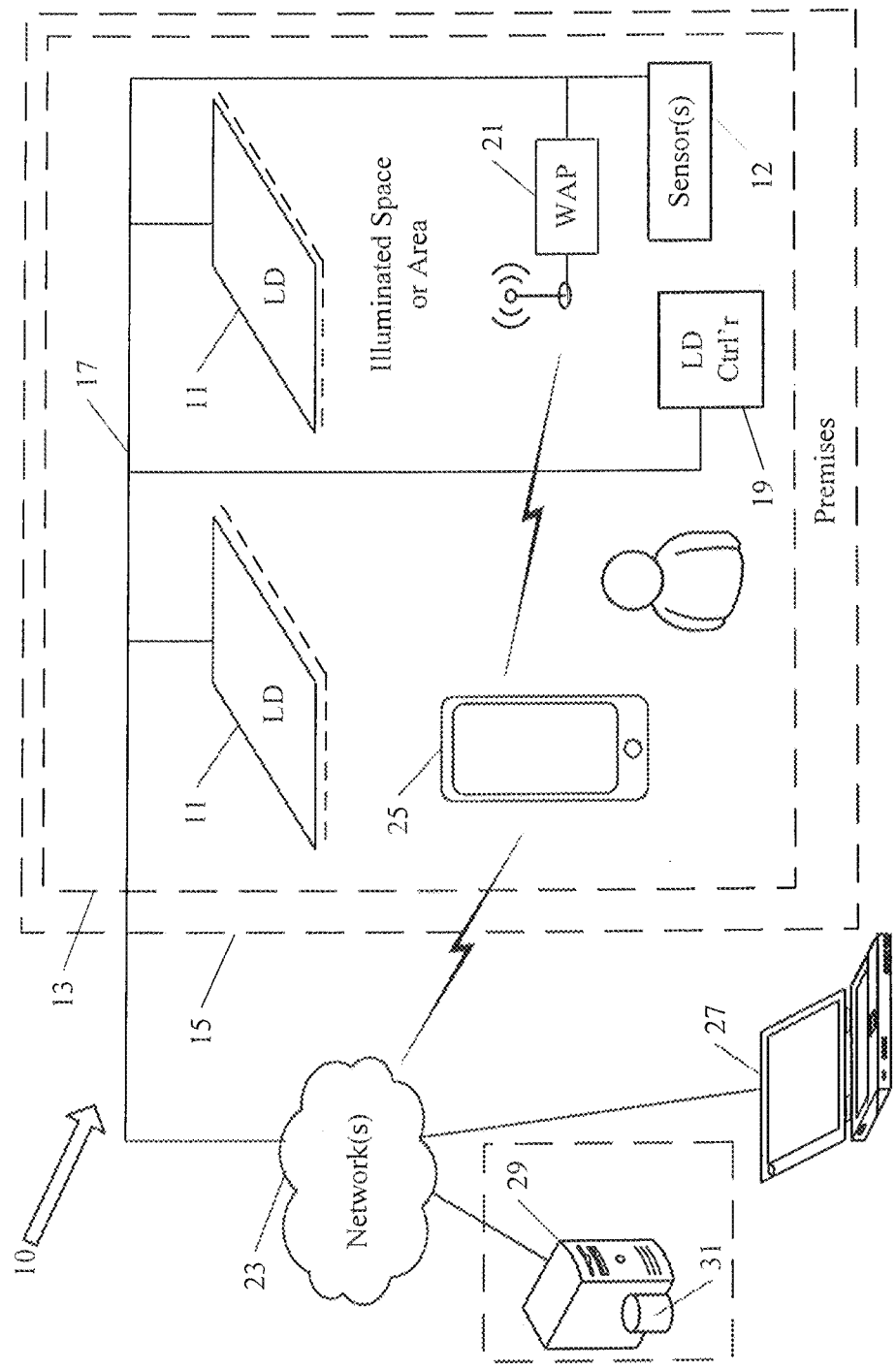
FIG. 8 is a simplified functional block diagram of a system in which the apparatuses and luminaires of FIGS. 1-7 may be implemented.

FIG. 8 illustrates a simplified functional block diagram of a system in which the apparatuses and devices of FIGS. 1A-7 may be implemented. In the examples of FIGS. 1A-7, the display light and/or general illumination light from an image display device provides an image visible to a person within the space in which a lighting device is installed.

In the examples, we have been considering so far, a processor, such as 723 configures the lighting device 11 to provide light output from an image display device, such as 719, and to operate the controllable lighting device 711 to provide general illumination and display of an image, based on lighting device configuration information provided to the lighting device 11 of FIG. 8.

FIG. 8 illustrates a system 10 for providing an image e.g. based on a user selection, to a controllable lighting device (LD) 11 of any of the types discussed herein. For purposes of discussion of FIG. 8, we will assume that controllable lighting device 711 generally corresponds in structure to the block diagram illustration of a device 711 in FIG. 7.

In FIG. 8, the controllable lighting device 11, as well as some other elements of system 10, are installed within a space 13 to be presented with an image and/or be illuminated at a premises 15. The premises 15 may be any location or locations serviced for lighting and other purposes by such system of the type described herein. Lighting devices, such as lighting devices 11, that are install to provide general illumination lighting in the premises 15 typically comply with governmental building codes (of the respective location of the premises 15) and/or lighting industry standards, such as OSHA, IES and ANSI, for illumination devices. Most of the examples discussed below focus on indoor building installations, for convenience, although the system may be readily adapted to outdoor lighting. Hence, the example of system 10 provides configurable lighting and possibly other services in a number of service areas in or associated with a building, such as various rooms, hallways, corridors or storage areas of a building and an outdoor area associated with a building. Any building forming or at the premises 15, for example, may be an individual or multi-resident dwelling or may provide space for one or more enterprises and/or any combination of residential and enterprise facilities. A premises 15 may include any number of such buildings, and in a multi-building scenario the premises may include outdoor spaces and lighting in areas between and around the buildings, e.g. in a campus (academic or business) configuration.

The system elements, in a system like system 10 of FIG. 8, may include any number of controllable lighting devices 11 as well as one or more lighting controllers 19. Lighting controller 19 may be configured to provide control of lighting related operations (e.g., ON/OFF, intensity, brightness) of any one or more of the lighting devices 11. Alternatively, or in addition, lighting controller 19 may be configured to provide control of the software configurable aspects of lighting device 11, as described in greater detail below. That is, lighting controller 19 may take the form of a switch, a dimmer, or a smart control panel including a user interface depending on the functions to be controlled through device 19. The lighting system elements may also include one or more sensors 12 used to control lighting functions, such as occupancy sensors or ambient light sensors.

The on-premises system elements 11, 12, 19, in a system like system 10 of FIG. 8, are coupled to and communicate via a data network 17 at the premises 15. The data network 17 in the example also includes a wireless access point (WAP) 21 to support communications of wireless equipment at the premises. For example, the WAP 21 and network 17 may enable a user terminal for a user to control operations of any lighting device 11 at the premises 13. Such a user terminal is depicted in FIG. 8, for example, as a mobile device 25 within premises 15, although any appropriate user terminal may be utilized. However, the ability to control operations of a lighting device 11 may not be limited to a user terminal accessing data network 17 via WAP 21 or other on-premises access to the network 17. Alternatively, or in addition, a user terminal such as laptop 27 located outside premises 15, for example, may provide the ability to control operations of one or more lighting devices 11 via one or more other networks 23 and the on-premises network 17. Network(s) 23 includes, for example, a local area network (LAN), a metropolitan area network (MAN), a wide area network (WAN) or some other private or public network, such as the Internet. In another example, a memory device, such as a secure digital (SD) card or flash drive, containing configuration data may be connected to one or more of the on-premises system elements 11, 12 or 19 in a system like system 10 of FIG. 6.

For lighting operations, the system elements for a given service area (11, 12 and/or 19) are coupled together for network communication with each other through data communication media to form a portion of a physical data communication network. Similar elements in other service areas of the premises are coupled together for network communication with each other through data communication media to form one or more other portions of the physical data communication network at the premises 15. The various portions of the network in the service areas in turn are coupled together to form a data communication network at the premises, for example to form a LAN or the like, as generally represented by network 17 in FIG. 8. Such data communication media may be wired and/or wireless, e.g. cable or fiber Ethernet, Wi-Fi, Bluetooth, or cellular short range mesh. In many installations, there may be one overall data communication network 17 at the premises. However, for larger premises and/or premises that may actually encompass somewhat separate physical locations, the premises-wide network 17 may actually be built of somewhat separate but interconnected physical networks utilizing similar or different data communication media.

System 10 also includes server 29 and database 31 accessible to a processor of server 29. Although FIG. 8 depicts server 29 as located outside premises 15 and accessible via network(s) 23, this is only for simplicity and no such requirement exists. Alternatively, server 29 may be located within premises 15 and accessible via network 17. In still another alternative example, server 29 may be located within any one or more system element(s), such as lighting device 11, lighting controller 19 or sensor 12. Similarly, although FIG. 8 depicts database 31 as physically proximate server 29, this is only for simplicity and no such requirement exists. Instead, database 31 may be located physically disparate or otherwise separated from server 29 and logically accessible by server 29, for example via network 17.

Database 31 is a collection of configuration information files for use in conjunction with one or more of controllable lighting devices 11 in premises 15 and/or similar devices 11 of the same or other users at other premises. For example, each configuration information file within database 31 includes lighting device configuration information to control operation of the general illumination lighting functions of the lighting devices 11. In the examples of the controllable lighting device 11, the lighting device 11 is controllable to provide general illumination lighting and/or an image display as described above with reference to the examples of FIGS. 1A-7.

Program aspects of the technology discussed above may be thought of as "products" or "articles of manufacture" typically in the form of executable code and/or associated data (software or firmware) that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software or firmware programming. All or portions of the programming may at times be communicated through the Internet or various other telecommunication networks. Such communications, for example, may enable loading of the software from one computer or processor into another, for example, from a management server or host computer of the lighting system service provider into the lighting device 711 of FIG. 7, or into any of the lighting devices, sensors, user interface devices, other non-lighting-system devices, etc. (FIG. 8) of or coupled to the system 11 via communication interfaces 117, including both programming for individual element functions and programming for distributed processing functions. Thus, another type of media that may bear the software/firmware program elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software.

As used herein, unless restricted to non-transitory, tangible or "storage" media, terms such as computer or machine "readable medium" refer to any medium that participates in providing instructions to a processor for execution.

The term "coupled" as used herein refers to any logical, physical or electrical connection, link or the like by which signals produced by one system element are imparted to another "coupled" element. Unless described otherwise, coupled elements or devices are not necessarily directly connected to one another and may be separated by intermediate components, elements or communication media that may modify, manipulate or carry the signals.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An apparatus, comprising:
  a general illumination light source configured to emit general illumination light for illuminating a space;
  an optical coupling configured to receive the general illumination light emitted by the general illumination light source and to direct general illumination light emitted by the light source toward a light output interface of the optical coupling;
  an optical array comprising optical passages there through, the optical passages being coupled to receive general illumination light via the light output interface of the optical coupling, wherein:
    a configuration of the optical coupling together with a configuration of the optical passages through the optical array define a distribution of general illumination light output of the apparatus into the illuminated space, and the distribution of general illumination light output includes near-field shadow regions formed between outputs of two or more of the optical passages; and display light emitters mounted at locations substantially corresponding to at least some of the near-field shadow regions of the optical array and being oriented to emit additional light into the space to be illuminated, wherein:

the display light emitters are configured to present pixels of light for presentation of an image, and the apparatus is configured to simultaneously display a portion of the image via the display light emitters and emit the general illumination light from the general illumination light source via the optical passages.

2. The apparatus of claim 1, wherein the near-field shadow regions are areas of relative darkness that is being screened or blocked from receiving a substantial portion of the directed general illumination light by the configuration of adjacent optical passages through the optical array.

3. The apparatus of claim 1, wherein the optical coupling comprises:

an interior surface configured to direct light received from the general illumination light source at a light input interface toward the light output interface, the directed light providing the general illumination to the space.

4. The apparatus of claim 3, wherein the interior surface is reflective and is formed as one of a parabolic reflector, a conical reflector, a faceted reflector, or a pyramidal reflector.

5. The apparatus of claim 1, wherein the optical array comprises:

an array of convexo-concave lens, each convexo-concave lens forming one of the optical passages, and each convexo-concave lens being configured to direct light received at a convex input interface of the convexo-concave lens and output the light from a concave output interface.

6. The apparatus of claim 1, further comprising a light input interface, wherein the light input interface includes:

an opening to accept the general illumination light source.

7. The apparatus of claim 1, wherein each optical passage is shaped as a polygon.

8. The apparatus of claim 1, wherein the optical array further comprises:

a grid of reflective members having angled walls defining the optical passages, the angled walls defining each optical passage being configured to reflect the directed light incident on the angled walls through the light output interface of each respective optical passage.

9. The apparatus of claim 8, wherein each optical passage has a height of approximately 7 millimeters and an open base has a width of approximately 3 millimeters, wherein the height is the distance from an edge made by two angled walls to a plane of the open base.

10. The apparatus of claim 1, wherein at least approximately 90% of the general illumination light emitted by the general illumination light source is output from the optical passages.

11. A luminaire, comprising:

a plurality of apparatuses coupled to one another, each of the apparatuses including:

a general illumination light source that emits general illumination light for illuminating a space;

an optical coupling having a light input interface and a light output interface, the optical coupling configured to direct general illumination light emitted by the general illumination light source at the light input interface toward the light output interface;

an optical array coupled to the light output interface of the optical coupling, the optical array comprising a plurality of optical passages and a plurality of optical array supports, wherein the optical array supports being in between adjacent optical passages of the plurality of optical passages; and a set of display light emitters in a spaced arrangement relative one another, each individual display light emitter of the set of display light emitters positioned near a corresponding optical array support of a respective optical passage, wherein:

each optical passage is configured to direct a portion of the light received from the light output interface toward an output of the optical passage, and the luminaire is configured to display an image via the set of display light emitters and emit general illumination light via the general illumination light source from the optical array.

12. The luminaire of claim 11, wherein the optical coupling of each of the apparatuses includes an interior surface that is reflective and is formed as one of a parabolic reflector, a conical reflector, a faceted reflector, or a pyramidal reflector.

13. The luminaire of claim 11, wherein each optical passage has a height of approximately 7 millimeters and an optical array support having an open base approximately 3 millimeters wide, wherein the height is the distance from an edge made by two angled walls to a plane of the open base.

14. An apparatus comprising:

a general illumination light source that emits general illumination light for illuminating a space;

an optical coupling having a light input interface and a light output interface, the optical coupling configured to direct general illumination light emitted by the general illumination light source at the light input interface toward the light output interface; and an array of convexo-concave lenses optically coupled to the light output interface, each convexo-concave lens of the array being configured to direct light received at a convex input interface of the respective convexo-concave lens and output the directed light from a concave output interface of the respective convexo-concave lens; and a display light board including:

a set of display light emitters configured to output an image, and optical apertures permitting light output from the convex output interface to pass through the display light board, wherein respective display light emitters of the set of display light emitters are positioned at a respective intersection point of adjacent convexo-concave lenses of the array of convex-concave lenses.

15. The apparatus of claim 14, wherein:

each respective intersection point of the adjacent convexo-concave lenses corresponds to a respective near-field shadow region, and the near-field shadow region is an area of relative darkness that is being screened or blocked off from the emitted general illumination light.

16. The apparatus of claim 14, wherein:

each convexo-concave lens of the array of convexo-concave lenses is configured to shift general illumination light incident on the convex input interface toward the optical apertures of the display light board, and the optical apertures are adjacent to the display light emitters.

* * * * *